D. E. LEWELLEN.
BEARING FOR VARIABLE SPEED TRANSMISSION MECHANISM.
APPLICATION FILED SEPT. 20, 1920.

1,375,053.

Patented Apr. 19, 1921.

INVENTOR.
DARCY E. LEWELLEN

BY
ATTORNEY.

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

BEARING FOR VARIABLE-SPEED TRANSMISSION MECHANISM.

1,375,053.

Specification of Letters Patent.

Patented Apr. 19, 1921.

Application filed September 20, 1920. Serial No. 411,404.

*To all whom it may concern:*

Be it known that I, DARCY E. LEWELLEN, a citizen of the United States, residing at Columbus, in the county of Bartholomew and State of Indiana, have invented certain new and useful Improvements in Bearings for Variable-Speed Transmission Mechanism, of which the following is a specification.

This invention relates to bearings for use in connection with variable speed transmission mechanisms, and the prime feature of the invention is the provision of a bearing which will act to receive radial as well as lateral thrusts, the bearing being provided with a single set of anti-friction members so arranged that they will receive lateral thrust and will also act to take up the radial bearing thrust at all times.

A further feature of the invention is the manner of mounting the bearings upon the hubs of the transmission disks or pulleys, the bearings being placed exteriorly of the hubs and around the peripheries thereof.

A further feature of the invention is the provision of means for holding the bearings in position on the hubs.

Other objects and advantages will be hereinafter more fully set forth and pointed out in the accompanying specification.

In the accompanying drawings which are made a part of this application,

Figure 1:
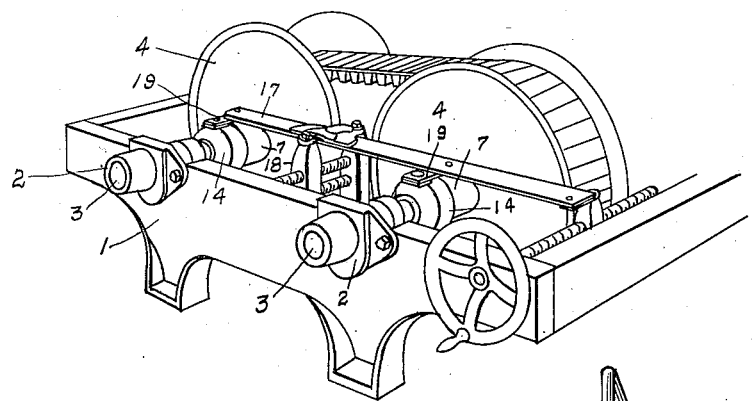
Figure 1 is a detail perspective view of a transmission mechanism.
Figure 2:
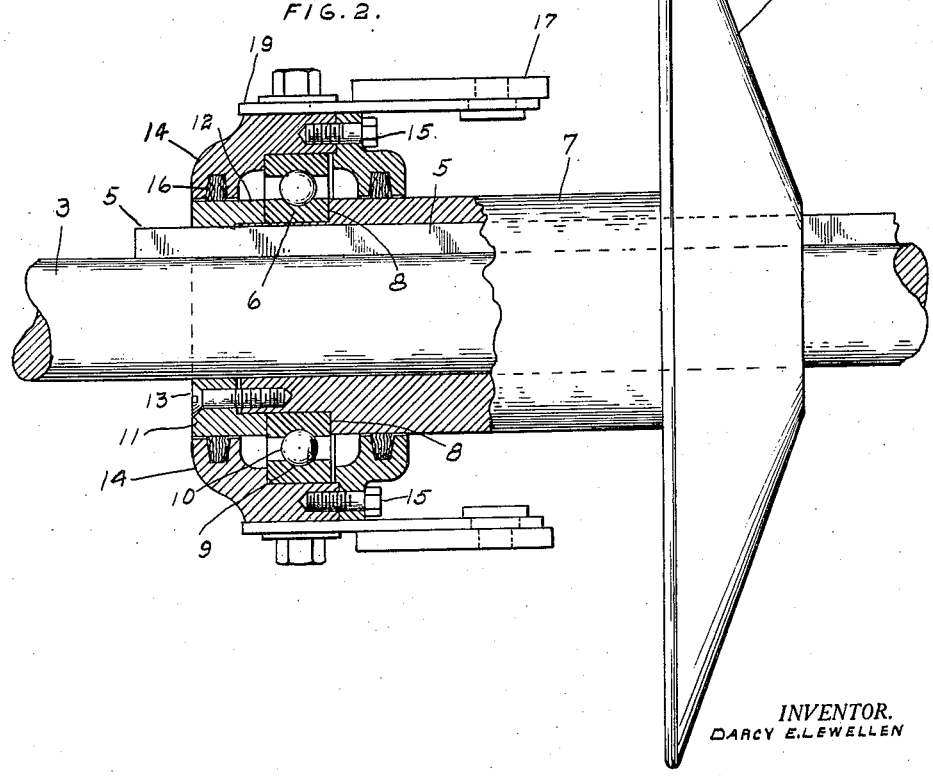
Fig. 2 is a detail elevation partly in section of one of the bearings mounted upon the hub of one of the transmission disks or pulleys, said parts being shown on an enlarged scale.

Referring to the drawings in which similar reference numerals designate corresponding parts throughout the several views, 1 indicates the frame which may be constructed in the usual or any preferred manner and such as is employed for supporting variable speed transmission pulleys or disks, said frame having bearings 2 thereon in which are mounted shafts 3, said shafts supporting the usual form of speed transmission pulleys or disks 4, said disks being slidably mounted on the shafts 3 and caused to rotate therewith by means of splines or keys 5.

Considerable difficulty is encountered in maintaining proper alinement between the means employed for moving the pulleys toward and from each other and the levers employed for shifting the pulleys, and to obviate this objectionable feature a bearing 6 is mounted upon the hub 7 of each pulley 4 and is placed around the periphery of the hub, the free end of the hub being cut away or reduced in diameter to form a shoulder 8 against which one face of the bearing 6 rests. The bearing 6 is preferably formed of two circular rings in the adjacent faces of which are formed races 9, and in these races are mounted any suitable form of anti-friction members, preferably bearing balls 10, said balls and races being so arranged that they will take up the peripheral thrust as well as the lateral thrust. Consequently the one bearing will serve for both purposes and greatly reduce the cost of production, and at the same time provide a more efficient structure. Any suitable means may be provided for holding the bearing in position on the hub, but in the present instance a cap 11 is introduced over the end of the shaft and is provided with a flange 12 which bears against the outer face of the bearing 6, a screw 13 being employed for holding the cap in position.

Surrounding the bearing 6, and forming an inclosure therefor, is a casing 14 which is preferably constructed in sections and secured together by bolts, or the like, 15, said housing being so arranged that when shifted laterally it will move the bearing and the parts to which the bearing is attached, said casing also forming a lubricant chamber around the bearing and having rings of packing 16 which prevent the lubricant from leaving the interior of the casing. The pulleys 4 are shifted lengthwise of the shafts 3 by means of levers 17 which are pivotally mounted to standards 18 and are connected to the casings 14 by links 19. In the present instance the spline 5 is shown as extending through and beyond the cap 11 so that the movement of the pulleys 4 on the shaft will not be limited, but it will be clearly understood that the spline may be mounted in the bearing in various ways, if desired.

It will be understood, of course, that roller bearings may be used instead of the ball bearings, although it is preferred to use the ball bearings as it is less expensive to manufacture them, and it is believed the ball bearings will give better results.

Having thus fully described my said invention, what I claim to be new and desire to secure by Letters Patent, is:

1. The combination with the hub of a variable speed transmission disk, said hub having a shoulder formed thereon, of a bearing surrounding said hub and abutting against said shoulder, anti-friction bearing members arranged in said bearing to receive both radial and lateral thrusts, means for holding the bearing in position on the hub, and a casing surrounding said bearing.

2. In a variable speed transmission mechanism, a shaft, a pulley mounted on said shaft, an elongated hub on said pulley, a combined radial and lateral thrust receiving bearing mounted on said hub and peripherally thereof, a cap for holding said bearing on the hub, and a spline carried by said shaft for causing the pulley to rotate with the shaft, said spline projecting through said cap.

In witness whereof, I have hereunto set my hand and seal at Indianapolis, Indiana, this 17th day of September, A. D. nineteen hundred and twenty.

DARCY E. LEWELLEN. [L. S.]

Witnesses:
CAREY S. FRYE,
M. L. SHULER.